United States Patent Office 2,714,094
Patented July 26, 1955

2,714,094
CERAMIC SURFACE CLEANSER

Michael J. McNally, Suffern, N. Y.

No Drawing. Application October 22, 1952,
Serial No. 316,323

2 Claims. (Cl. 252—152)

This invention relates to novel compositions of matter and to methods for cleansing. In one of its more specific aspects the invention is directed to novel methods for cleansing ceramic type surfaces and also to novel compositions to be employed in cleansing.

For many years ceramic type surfaces, such as tile for example, have been employed in public, commercial, industrial and private buildings. Such surfacing materials have been widely employed for many many years and have been characterized by their long life due primarily to their great wear characteristics. In the course of normal usage, the tile surface becomes soiled and frequently becomes discolored due to compounds deposited thereon from washing water, residues, curds and other matter depositing on the tile, and in many cases the discoloration may not be removed by employing the normal household detergents and soaps. While a variety of different combinations, such as those disclosed in the United States patents to Nelson 1,574,406 and 1,574,407, have been proposed for cleaning granite, none of them has been entirely satisfactory for one reason or another. In general, they have failed either because they have been ineffective in eliminating the discoloration, or while the discoloration has been removed, the original appearance of the tile has not been restored or their use would present a very dangerous health hazard to the user or require such exacting methods of usage as to be commercially impracticable.

After considerable experimentation with various compounds, I have discovered that ceramic surfaces such as tile, porcelain, terrazo, vitreous enamel and other such types of siliceous finishes may be readily and easily cleansed by employing my novel composition. The novel composition when dissolved in water provides a solution which upon application to such surfaces to be cleansed is eminently effective to remove or eliminate discoloration, restores the original appearance of the surface, does not present a dangerous health hazard and requires no exacting methods of application or usage.

In the course of my experimentation with various compositions, I have found that aqueous solutions of sodium bi-fluoride as well as aqueous solutions of potassium bi-fluoride were entirely and completely ineffective as cleansing agents for ceramic surfaces. I also found that the aqueous solutions of ammonium derivative, namely ammonium fluoride, effectively cleansed certain ceramic surfaces.

According to this invention, I have provided a novel combination comprising ammonium bi-fluoride, ammonium chloride and a detergent. All of said components are normally solid in the dry state. The detergent is normally solid, water soluble and compatible with both the ammonium bi-fluoride and ammonium chloride when in aqueous solution. Examples of some of the detergents are "Lathanol LAL" which is a sodium lauryl sulfonate; "Nopalcol HO-36" which is a polymethylene oleyl type alcohol; "Anatron L-135" which is a sodium alkyl amide sulfonate: "Anatron N-125" which is a sodium alkyl ester sulfonate; and "Anatron R-155" which is a sodium alkyl aryl sulfonate. The ratio by weight of the ammonium bi-fluoride to the ammonium chloride in the dry mix is in the range of 6-25 parts of ammonium bi-fluoride to 12-70 parts of ammonium chloride, and the ratio by weight of the detergent to the sum of the weights of the ammonium bi-fluoride and ammonium chloride in said mix is 1 part of detergent to 18–95 parts of the sum of the weights of the ammonium bi-fluoride and ammonium chloride. One of the more preferable mixes comprises by weight approximately 10 parts of ammonium bi-fluoride, 20 parts of ammonium chloride and 1 part of detergent. The compositions of this invention are dissolved in approximately 142 parts of water, with the amount and proportions of the components chosen to provide solutions of desired concentration.

Such novel solutions may be swabbed on to the surface to be cleansed and allowed to remain thereon for at least 10 minutes. At the end of this 10 minute period, the action of the cleansing solution upon the ceramic surfaces will have terminated automatically. At the end of that period or any time thereafter, the surface is then washed with common tap water in the usual manner employing the ordinary cleaning equipment. After the fresh water has been applied, the surface will be found to have had all surface soiling and discoloration completely removed and now its original clear, clean and sparkling surface will have been completely restored.

Since certain changes may be made in the above product and different embodiments of the invention could be made without departing from the scope thereof, it is intended that all matter contained in the above description shall be interpreted as illustrative and not in a limiting sense.

It is also to be understood that the following claims are intended to cover all the generic and specific features of the invention herein described, and all statements of the scope of the invention which as a matter of language might be said to fall therebetween.

It is also to be understood that the following claims are intended to cover all the generic and specific features of the invention herein described, and all statements of the scope of the invention which as a matter of language might be said to fall therebetween, and that they are intended to be inclusive in scope and not exclusive in that, if desired, other materials may be added to my novel composition of matter herein claimed without departing from the spirit of the invention. Particularly it is to be understood that in said claims ingredients or components recited in the singular are intended to include compatible mixtures of said ingredients wherever the sense permits.

I claim:

1. A ceramic surface cleansing composition of matter whose active ingredients consist essentially of (a) ammonium bi-fluoride, (b) ammonium chloride, and (c) a normally solid, water soluble and compatible detergent, the ratio by weight of (a) to (b) being 6–25 parts of (a) to 12–70 parts of (b) and the ratio by weight of (c) to the sum of the weights of (a) and (b) being 1 part of (c) to 18–95 parts of the sum of the weights of (a) and (b).

2. A ceramic surface cleansing agent whose active ingredients consist essentially of by weight approximately 10 parts of ammonium bi-fluoride, 20 parts of ammonium chloride and 1 part of a normally solid, water soluble and compatible detergent.

References Cited in the file of this patent

UNITED STATES PATENTS 2,489,152 Panepinto Nov. 22, 1949

OTHER REFERENCES

The Chemical Formulary by Bennett, vol. III. D. Van Nostrand Co., New York, page 332 (1936).

The Chemical Formulary by Bennett-Chemical Publishing Co., New York, vol. VII (1945), page 373 (No. 5). (Copies available in Scientific Library.)